United States Patent
Tamura et al.

(10) Patent No.: US 8,474,973 B2
(45) Date of Patent: Jul. 2, 2013

(54) INFRARED ABSORBING POLARIZED EYEGLASS LENS

(75) Inventors: Kanichi Tamura, Osaka (JP); Shoichi Mitsuuchi, Kanan (JP); Kenzo Wada, Kashiwara (JP)

(73) Assignee: Talex Optical Co., Ltd., Osaka (JP)

( * ) Notice: Subject to any disclaimer, the term of this patent is extended or adjusted under 35 U.S.C. 154(b) by 161 days.

(21) Appl. No.: 13/042,603

(22) Filed: Mar. 8, 2011

(65) Prior Publication Data

US 2012/0229759 A1 Sep. 13, 2012

(51) Int. Cl.
*G02C 7/16* (2006.01)
*G02C 7/12* (2006.01)
*G02C 7/10* (2006.01)

(52) U.S. Cl.
USPC ............ 351/159.57; 351/159.56; 351/159.62; 351/159.75

(58) Field of Classification Search
USPC ............... 351/159.49, 159.56, 159.57, 159.6, 351/159.62, 159.63, 159.65, 159.74
See application file for complete search history.

(56) References Cited

U.S. PATENT DOCUMENTS

| | | | | |
|---|---|---|---|---|
| 3,850,502 A | * | 11/1974 | Bloom | 359/352 |
| 7,506,977 B1 | * | 3/2009 | Aiiso | 351/159.63 |
| 7,901,074 B2 | * | 3/2011 | Yamamoto et al. | 351/159.6 |
| 8,147,946 B2 | * | 4/2012 | Kato | 428/174 |
| 2002/0068809 A1 | | 6/2002 | Tamura et al. | |
| 2010/0277688 A1 | * | 11/2010 | Baiocchi et al. | 351/163 |

FOREIGN PATENT DOCUMENTS

| | | |
|---|---|---|
| JP | 7-72332 | 3/1995 |
| JP | 2001-311804 | 11/2001 |
| JP | 2002-187931 | 7/2002 |
| JP | 2003-107412 | 4/2003 |
| JP | 2005-043921 | 2/2005 |
| JP | 2010-85911 | * 4/2010 |

OTHER PUBLICATIONS

Japanese Office Action issued Nov. 29, 2011 in corresponding Japanese Application No. 2008-257410, with English translation.

* cited by examiner

*Primary Examiner* — Jordan Schwartz
(74) *Attorney, Agent, or Firm* — Wenderoth, Lind & Ponack, L.L.P.

(57) ABSTRACT

An infrared absorbing polarized eyeglass lens substrate includes a polarizing element including a polarizing film and a polyurethane resin material containing an infrared absorbing agent and covering both surfaces of the polarizing film, and an eyeglass lens substrate made of a polyurethane resin not containing an infrared absorbing agent and configured to be ground for adjusting lens power. The polarizing element is superposed on one side of the eyeglass lens substrate and integrated therewith by insert molding which accompanies polymerization reaction of the polyurethane resin material.

14 Claims, 3 Drawing Sheets

INFRARED ABSORBING POLARIZED EYEGLASS LENS

BACKGROUND OF THE INVENTION

This invention relates to an infrared absorbing eyeglass lens substrate made of a polyurethane resin, and a method of manufacturing such a lens substrate.

Ordinarily, an eyeglass lens is formed by casting polymerization with a convex lens surface formed on the front side and a concave or flat surface formed on the back side. In order to adjust its lens power, only its back side is ground with its front side not ground. Then one or more coatings are optionally provided on the lens to improve its performance.

A polarized eyeglass lens substrate includes a polarizing element including a polarizing film and integrally superposed on the above-described eyeglass lens substrate. The polarizing film is formed by uniaxially stretching a resin film with a polarizing dye such as iodine impregnated.

In order to form a polarized eyeglass lens substrate by casting/polymerization, a polarizing film is pre-shaped so as to have a predetermined curvature and fitted in a ring-shaped gasket having a diameter corresponding to the diameter of the lens substrate so as to extend along the inner periphery of the gasket. Then, a pair of molds are provided over and under the polarizing film, respectively, liquid-tightly fitted into the gasket, and a monomer is poured into the cavity defined between the molds, thereby integrating the monomer with the polarizing element by polymerizing the monomer (see JP Patent Publication 2001-311804A).

Eyeglasses are useful not only to correct eyesight but also to protect eye cells from harmful light beams. For the latter purpose, many eye protecting means such as sunglasses and light shield eyeglasses use ultraviolet absorbing eyeglass lenses containing ultraviolet absorbing agents that prevent transmission of ultraviolet rays.

It is also required for eyeglass lenses to eliminate not only ultraviolet rays but also infrared rays.

Among infrared rays, electromagnetic waves in the wavelength range of 780 to 1300 nm, which are invisible, are called near-infrared rays, and electromagnetic waves in the wavelength range of 1300 to 2000 nm, which are also invisible, are called middle-infrared rays. Infrared rays in these wavelength ranges can penetrate as deep as 30 mm into human skin. Near-infrared rays in particular can penetrate the cornea and almost reach the retina, and thus could damage the eyeground.

Not only may human eyes suffer from thermal burns when exposed to intense light for a short moment, but damage may accumulate over a long period of time, causing e.g. retinopathy, and clouding of the crystalline lens (cataract).

Ordinary known infrared absorbing pigments for preventing transmission of infrared rays, i.e. pigments capable of absorbing infrared rays (also called "infrared absorbing agents") include compounds of the azo family, aluminum family, anthraquinone family, cyanine family, polymethine family, diphenylmethane family, triphenylmethane family, quinine family, diimonium family, dithiol metal complex family, squarylium family, phthalocyanine family, and naphthalocyanine family.

An infrared absorbing filter is known which includes an infrared absorbing layer formed by applying and drying a solvent-containing coating liquid comprising a resin composition in which one or more of the above-mentioned infrared absorbing agents are dispersed in a binder resin (see JP Patent Publication 2005-43921A).

JP Patent Publication 2003-107412A discloses (in claims 2 to 4 and paragraphs [0013], [0020], [0022] and [0023]) an eyeglass lens made of a synthetic resin having excellent optical properties as eyeglasses, such as polycarbonate, diethylene glycol bisallyl carbonate (CR-39), or polymethylmethacrylate (PMMA) to which 0.001 to 0.05% by weight of one or more of the above-mentioned infrared absorbing agents.

But in these conventional arrangements, in order not to deteriorate the optical properties inherent to the eyeglass lens, the thickness of the coating layer formed on the surface of the lens and containing an infrared absorbing agent has to be as thin as possible. Such a thin coating layer cannot sufficiently absorb infrared rays.

In order to give a general-purpose lens the ability to absorb infrared rays, it may be also possible to disperse an infrared absorbing agent in a thermoplastic resin material, and melt the thermoplastic resin by heating to form the lens. But in this case, optical strains may develop in the lens. Also, since it is impossible to sufficiently filter out foreign matter in the resin, no high-quality lenses can be formed with this method.

As the thermoplastic resin material for eyeglass lenses, methyl methacrylate (MMA) resin and polycarbonate (PC) resin are preferentially used because they are highly transparent. But MMA is not sufficiently impact-resistant. PC is sufficiently high in impact resistance if it has a predetermined molecular weight. But PC requires a molding temperature of 250° C. or higher. At such high temperature, the infrared absorbing agent deteriorates and decomposes. Thus it is impossible to obtain a lens having both the ability to absorb infrared rays and impact resistance.

CR-39, which is a typical casting hardening type resin used for plastic eyeglass lenses, and medium refractive index resins (such as Corporex, made by NOF Corporation; refractive index: 1.56) contain allyl diglycol carbonate and are anaerobic thermosetting resins which harden using diisopropyl peroxydicarbonate (hereinafter referred to as "IPP"). Since the catalyst used, i.e. IPP is a peroxide, the infrared absorbing agent deteriorates and decomposes by reacting with the peroxide, and cannot sufficiently absorb infrared rays.

Thiourethane resins are known as high refractive index resins obtained by chemically binding isocyanate and polythiol (such as thiourethane resin MR-7, made by Mitsui Chemicals, Inc.; refractive index: 1.67). When an infrared absorbing agent was added to one of these resins, it deteriorated and decomposed by reacting with sulfur components or catalysts, so that it was unable to sufficiently eliminate infrared rays.

From the structural viewpoint too, conventional infrared absorbing polarized eyeglass lens substrates have various problems.

For example, as shown in FIG. 7, if an eyeglass lens is formed in which an expensive property improving agent such as an infrared absorbing agent is present throughout the entirety of the resin composition forming the lens substrate B, in order to form a lens having a predetermined lens power, most part, i.e. the portion b' of the lens substrate B is removed by grinding with only the small surface portion b, which is shown by one-dot chain line in FIG. 7, left. Thus, when the portion b' is removed, most of the expensive property improving agent is also removed and discarded.

Also, since a prescription lens has a varying thickness in the radial direction according to its lens power, the amount per unit area of the property improving agent such as an infrared absorbing agent, which is uniformly contained in the lens substrate before being ground, varies with the thickness of the lens. Thus, it is impossible to uniformly absorb infrared rays over the entire area of the lens. Also, since an infrared absorbing agent usually has a color tone, a single lens has different tints according to local differences in thickness. This makes it impossible to stably produce high-quality lenses of uniform specifications.

If resin layers containing property improving agents such as an infrared absorbing agent are simultaneously formed on both sides of the polarizing film by casting, one of the two resin layers is a thick one forming the eyeglass lens substrate configured to be ground for adjusting the lens power, while the other resin layer is a thin one. Thus, when forming such resin layers by casting, the resin material flows at different speeds on the two opposite sides of the polarizing film. This may cause the polarizing film to be twisted, which could in turn cause separation of the film from the gasket, or reversal of the film. Also the resin layers may develop portions where its density is not uniform, or striae. Thus makes the lens inhomogeneous, thus causing non-uniform refractivity and flickering of the light that passes the lens.

A first object of the present invention is to provide an infrared absorbing polarized eyeglass lens substrate of which the infrared absorbing agent contained in the lens substrate is scarcely removed when the lens substrate is ground to adjust its lens power, and is less likely to deteriorate or decompose under heat during molding, thus sufficiently maintaining the ability to absorb infrared rays, and of which the color tone is uniform.

A second object of the present invention is to provide a method of efficiently producing the above-mentioned infrared absorbing eyeglass lens substrate which prevents separation of the polarizing film from the gasket, reversal and undue movement of the film, and which is free of striae, i.e. non-uniformity in density of the resin.

SUMMARY OF THE INVENTION

In order to achieve the first object of the invention, there is provided an infrared absorbing polarized eyeglass lens substrate comprising a polarizing element comprising a polarizing film and a polyurethane resin material containing an infrared absorbing agent and covering two surfaces of the polarizing film, and an eyeglass lens substrate made of a polyurethane resin not containing an infrared absorbing agent and configured to be ground for adjusting lens power, the polarizing element being superposed on one side of the eyeglass lens substrate and integrated therewith by insert molding which accompanies polymerization reaction of the polyurethane resin material.

With this infrared absorbing eyeglass lens substrate, while the polarizing element includes a polyurethane resin containing an infrared absorbing agent and covering both sides of the polarizing film, since the eyeglass lens substrate configured to be ground for adjustment of lens power does not contain an infrared absorbing agent, even when the back of the eyeglass lens substrate is ground to adjust lens power, the infrared absorbing agent contained in the polarizing element is never removed.

With this infrared absorbing eyeglass lens, while the polarizing element is integrally superposed on one side of the eyeglass lens substrate by insert molding accompanying polymerization reaction of the polyurethane resin material, since the infrared absorbing agent is used in combination with the polyurethane resin composition, it is possible to prevent deterioration of the infrared absorbing agent in its ability to absorb infrared rays and reduction in transmission of visible light, due to additives such as peroxides (polymerization catalysts and polymerization initiators such as benzoyl peroxide).

Moreover, since this lens can be formed at a relatively low temperature and no high molding temperature exceeding 250° C., as in the prior art, is necessary, the infrared absorbing agent is less likely to deteriorate due to heating.

In particular, the polyurethane resin material comprises as a major component a prepolymer obtained by reacting polyisocyanate with a polyhydroxy compound, and further contains an aromatic polyamine as a curing agent.

This polyurethane resin composition is a polymer comprising a bifunctional compound to which atom groups having isocyanate groups, which can be easily added, are added, and needs no polymerization catalysts or polymerization initiators in the form of peroxides. Also, the infrared absorbing agent never deteriorates during casting and the later curing.

The amount of the infrared absorbing pigment added to the polyurethane resin composition is controlled such that the average transmittance of infrared rays in the wavelength range of 780 to 2500 nm is restricted to 80% or less, preferably 30% or less.

In order for the infrared absorbing eyeglass lens according to the present invention to be highly transparent and sufficiently impact-resistant, the polyisocyanate is preferably 4,4'-methylene-bis(cyclohexyl isocyanate) or isophorone diisocyanate, the polyhydroxy compound is preferably a polyether diol or a polyester diol having an average molecular weight of 700 to 1200 or a mixture thereof, and further, the aromatic polyamine is preferably 4,4'-methylenebis(2-chloroaniline). In order to further improve the impact resistance of the infrared absorbing eyeglass lens, the prepolymer is a polyurethane prepolymer obtained by reacting polyisocyanate with a polyhydroxy compound in the reaction molar ratio (NCO/OH) of 2.5 to 4.0 so that its NCO content is 7.0 to 14.0%.

The opposed two surfaces of the polarizing film is preferably covered by layers of the polyurethane resin of the same thickness, respectively, for homogeneous casting. But needless to say, the respective layers may have different thicknesses in view of the design of the lens.

In order to achieve the second object of the invention, the present invention provides a method of manufacturing an infrared absorbing eyeglass lens substrate, the method comprising forming an eyeglass lens substrate from a polyurethane resin not containing an infrared absorbing pigment, the eyeglass lens substrate being configured to be ground for adjusting lens power, inserting the thus formed eyeglass lens substrate into a mold assembly for forming eyeglass lenses, inserting a polarizing film into a cavity defined by a lens surface of the eyeglass lens substrate and an inner surface of the mold assembly with laminar gaps defined on two surfaces of the polarizing film, respectively, and pouring a polyurethane resin material containing an infrared absorbing pigment into the mold assembly such that the laminar gaps are filled with the polyurethane resin material, thereby casting the polyurethane resin material into a polarizing element, whereby the polarizing element is superposed and integrated with the eyeglass substrate due to polymerization reaction of the polyurethane resin material.

The present invention provides another method of manufacturing an infrared absorbing eyeglass lens substrate, the method comprising forming a polarizing element comprising a polarizing film and a polyurethane resin material containing an infrared absorbing pigment and covering two surfaces of the polarizing film, inserting the thus formed polarizing element into a mold assembly for forming lenses, and pouring a polyurethane resin not containing an infrared absorbing pigment into a gap defined between the polarizing element and the mold assembly, thereby casting the polyurethane resin into an eyeglass lens substrate configured to be ground for adjusting lens power, whereby the polarizing element is superposed and integrated with the eyeglass substrate due to polymerization reaction of the polyurethane resin material.

With this arrangement, when the lens substrate is ground to adjust lens power, the expensive infrared absorbing agent is never removed. Also, the infrared absorbing agent maintains its ability to absorb infrared rays without deteriorating or decomposing.

Moreover, the ability of the infrared absorbing agent to absorb infrared rays is uniform over the entire area of the lens irrespective of any local difference in thickness of the lens. The color tone of the lens due to the infrared absorbing agent is also uniform irrespective of any local difference in thickness of the lens.

Such an infrared absorbing polarized eyeglass lens substrate can be produced using either of the above-described two methods of the present invention. In the first method, since the polarizing film is inserted into the cavity with laminar gaps defined on the both surfaces of the polarizing film, and a polyurethane resin material containing an infrared absorbing pigment is poured into the mold assembly such that the laminar gaps are filled with the polyurethane resin material, resin layers of substantially the same thickness can be easily formed on both sides of the polarizing film. This allows the urethane resin material to flow on both sides of the polarizing film at a constant speed during casting, which in turn prevents separation of the polarizing film from the gasket, reversal and undue movement of the film, and also prevents striae, i.e. non-uniformity in density of the resin.

In the method in which the polarizing element is inserted into a mold assembly for forming lenses, and a polyurethane resin not containing an infrared absorbing pigment is poured for casting, too, resin layers of substantially the same thickness can be easily formed on both sides of the polarizing film. This allows the urethane resin material to flow on both sides of the polarizing film at a constant speed during casting, which in turn prevents separation of the polarizing film from the gasket, reversal and undue movement of the film, and also prevents striae, i.e. non-uniformity in density of the resin.

DETAILED DESCRIPTION OF THE PREFERRED EMBODIMENTS

Now the present invention is described with reference to the drawings.

Figure 1:
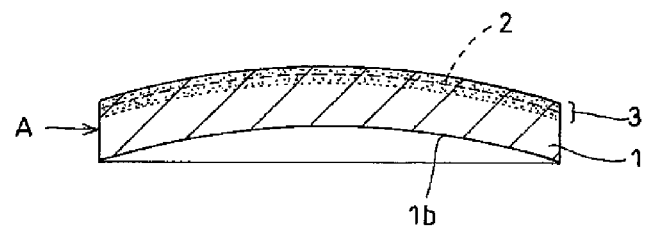
FIG. 1 is a sectional view of an infrared absorbing eyeglass lens substrate embodying the present invention.
Figure 2:
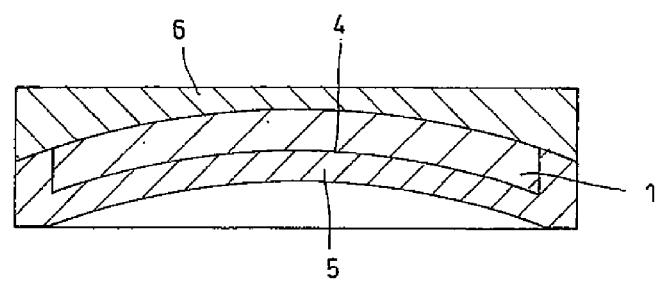
FIG. 2 is a sectional view of a mold assembly for forming an eyeglass lens substrate.
Figure 3:
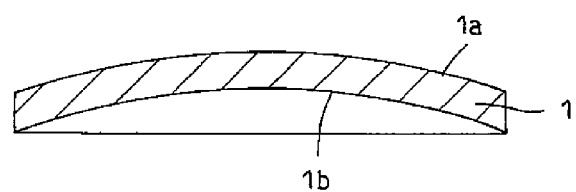
FIG. 3 is a sectional view of the eyeglass lens substrate.

FIGS. 1 to 3 show an infrared absorbing eyeglass lens substrate A embodying the present invention. This lens substrate A comprises a polarizing element 3 including a polarizing film 2 having both sides thereof coated with polyurethane resin containing infrared absorbent, and an eyeglass lens substrate 1 which is made of polyurethane resin not containing any infrared absorbing agent, and of which the concave lens surface 1b is adapted to be ground for adjusting lens power. The polarizing element 3 is fixedly superposed on the convex lens surface 1a of the eyeglass lens substrate 1, which is on the opposite side of the concave lens surface 1b, by insert molding which accompanies polymerization reaction of polyurethane resin.

The polarizing film 2 is formed by a well-known method, and is preferably formed by uniaxially stretching e.g. a polyvinyl alcohol film containing iodine, an iodine compound or a dye by e.g. impregnation.

In order to coat both sides of the polarizing film 2 with a polyurethane composition, the polarizing film 2 is subjected to insert molding in a curved mold, or sheets of polyurethane resin composition are laminated on both sides of the polarizing film. Adhesive may be disposed therebetween, if necessary.

The polyurethane resin composition forming the polarizing element 3 comprises as a major component a polyurethane resin obtained by addition polymerization of a prepolymer obtained by reacting polyisocyanate with a polyhydroxy compound, and an aromatic polyamine as a curing agent, and further contains an infrared absorbing agent.

In order to produce the infrared absorbing lens substrate A, the eyeglass lens substrate 1, which is adapted to be ground to adjust lens power, is first formed as shown in FIGS. 2 and 3, using a polyurethane resin composition not containing an infrared absorbing pigment.

The eyeglass lens substrate 1, as well as the polarizing film 3, may be formed by casting. This method is described roughly first. A pair of convex and concave molds for forming lenses are liquid-tightly fitted together through a ring-shaped gasket, and a mixture of the prepolymer and the aromatic polyamine as a curing agent is poured into a cavity defined between the pair of molds. The mixture is then polymerized and cured.

When fitting the convex and concave molds together through the gasket, the polarizing film is inserted in the gasket beforehand. In this state, a monomer of the resin material is poured into the cavity through injection ports formed in one of the molds or the gasket so as to flow along both sides of the polarizing film, thereby covering the film with the resin. Then, the resin is polymerized and cured.

More specifically, the polyurethane resin material is preferably a polyurethane resin composition comprising a polyurethane prepolymer obtained by reacting e.g. polyisocyanate with a polyhydroxy compound in the reaction molar ratio (NCO/OH) of 2.5 to 4.0 so that its NCO content is 7.0 to 14.0%, and an aromatic polyamine, and obtained by reacting the polyurethane prepolymer with the aromatic polyamine in the reaction molar ratio (NCO/NH$_2$) of 1.10 to 0.90.

In a method of manufacturing the infrared absorbing eyeglass lens substrate according to the first embodiment of the present invention, after forming the above-described eyeglass lens substrate 1, the eyeglass lens substrate 1 is inserted in molds for forming polarized eyeglass lenses.

The eyeglass lens substrate 1 is formed by casting in a meniscus-shaped cavity for forming lens substrates defined by a disk-shaped lower mold 5 formed with a meniscus recess 4 and an upper mold 6 for forming a top surface of a convex lens.

Figure 4:
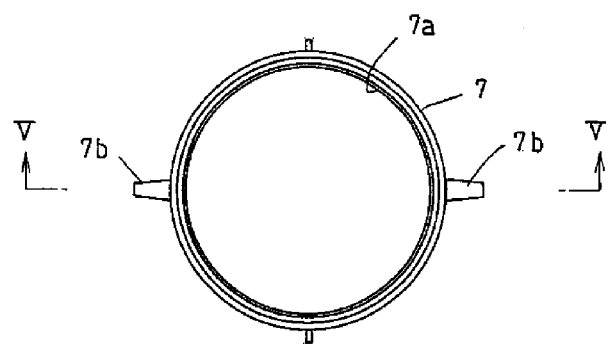
FIG. 4 is a plan view of a gasket of a mold assembly for forming the infrared absorbing eyeglass lens substrate.
Figure 5:
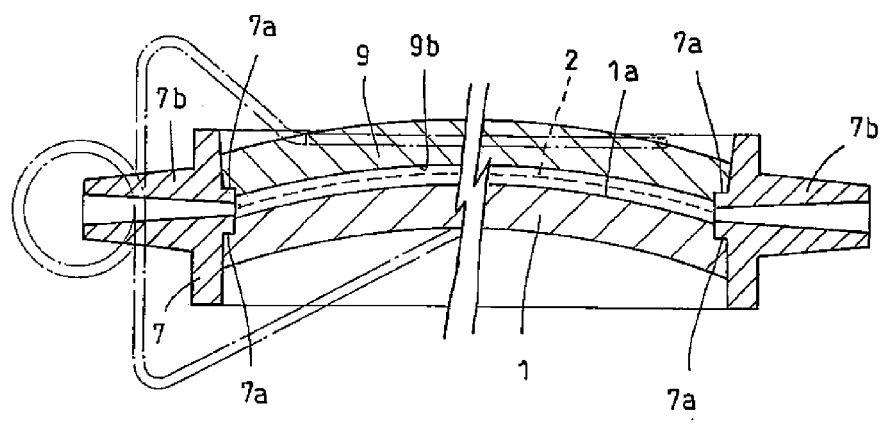
FIG. 5 is a sectional view of the mold assembly and its gasket, taken along line V-V of FIG. 4, and showing a manufacturing method of a first embodiment.

After molding, the eyeglass lens substrate 1 is removed from the molds as shown in FIG. 3, and then, as shown in FIGS. 4 and 5, inserted in a mold assembly for insert molding, which includes a ring-shaped gasket 7 and an upper mold 9. At this time, the lens substrate 1 itself may be used as a lower mold (or a separate lower mold may be provided). Then the polarizing film 2 is inserted in a laminar cavity defined between the lens surface 1a and the inner surface 9b of the upper mold 9 so that laminar gaps are defined both on the front and back sides of the polarizing film 2.

In particular, as shown in FIGS. 4 and 5, the lens substrate 1 is fitted in the gasket 7 so that no gap forms therebetween, and the polarizing film 2 is then inserted so as to be located over the lens substrate 1 with a gap of e.g. about 1 mm left therebetween. In this state, the polarizing film 2, which is preformed so as to extend along the top surface of the lens substrate 1, is supported by an annular protrusion 7a extending along the center of the inner periphery of the gasket 7.

The lens substrate 1 has a shoulder formed on its outer periphery by cutting and fitted on the inner periphery of the gasket 7 at its lower portion.

Over the polarizing film 2, the upper mold 9, which is a disk-shaped member having the concave spherical inner surface 9b, is liquid-tightly fitted in the gasket 7 at its upper portion so that its inner surface 9b is spaced from the polarizing film by e.g. about 1 mm.

The eyeglass lens substrate 1 and the upper mold 9 are fixed to the gasket 7 preferably by elastically pressing them from upward and downward against the gasket 7 with a clip shown by chain line in FIG. 5, with protective members disposed between the clip and the upper mold and the lens substrate.

In this state, a mixture of the above-mentioned prepolymer and curing agent is injected into the laminar space defined over the eyeglass lens substrate 1 through gates 7b. Thus, the polarizing film 2 is covered with the polyurethane composition due to insert molding including polymerization reaction of the polyurethane resin material, and simultaneously, the gap between eyeglass lens substrate 1 and the polarizing film, which is e.g. 1 to 2 mm, is filled with the polyurethane resin composition. Thus, the infrared absorbing eyeglass lens substrate shown in FIG. 1 is produced, which comprises the eyeglass lens substrate 1 and the polarizing element 3 integrally fixed to the lens substrate 1.

Since the lens substrate 1 of the thus formed infrared absorbing eyeglass lens substrate contains no infrared absorbing agent, no infrared absorbing agent is removed together with the material of the lens substrate 1 when the lens substrate 1 is ground to adjust its lens power. Also, since the lens substrate 1 contains no infrared absorbing agent, the ability of the lens substrate to absorb infrared rays is uniform over the entire area thereof irrespective of any difference in thickness of the lens substrate between its central portion and peripheral portion.

Figure 6:
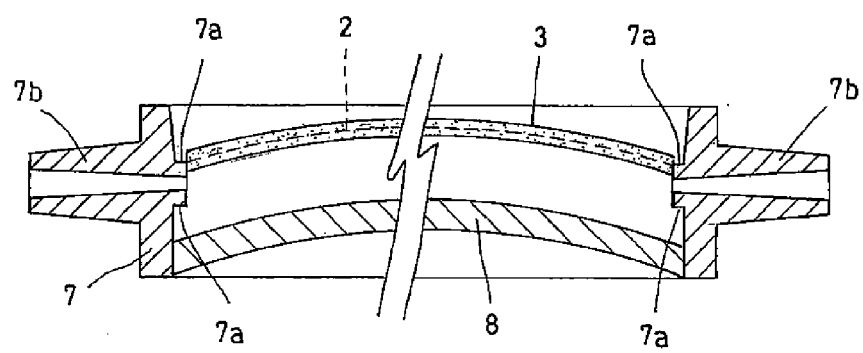
FIG. 6 is a sectional view of a mold assembly and its gasket for use in a manufacturing method of a second embodiment.
Figure 7:
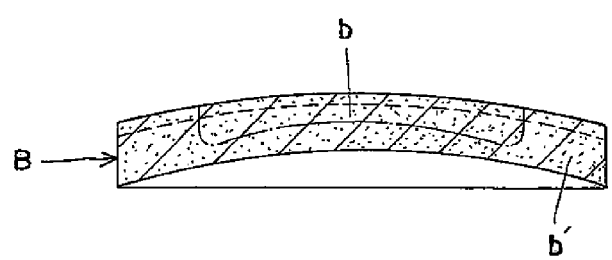
FIG. 7 is a sectional view of a conventional infrared absorbing eyeglass lens substrate.

In the method of manufacturing the infrared absorbing eyeglass lens substrate according to the second embodiment of the present invention, as shown in FIG. 6, a polarizing element 3 including a polarizing film 2 having both sides thereof covered with a polyurethane resin material containing an infrared absorbing pigment is inserted in a eyeglass lens forming mold assembly including a gasket 7 and a lower mold 8. In this embodiment, the polarizing element 3 serves as an upper mold. In this state, a polyurethane resin material not containing an infrared absorbing agent is poured into the gap between the polarizing element 3 and the lower mold 8 to form an eyeglass lens substrate 1 integrally superposed on the polarizing element due to polymerization reaction.

The polarizing element 3 of the second embodiment is formed substantially in the manner shown in FIG. 5, except that a lower mold (not shown) is used instead of the lens substrate 1. In particular, with the lower mold fitted in the gasket 7, the polarizing film 2 is inserted over the lower mold and supported on the annular protrusion 7a so as to be spaced from the lower mold by e.g. 1 mm. Then, the upper mold 9 is fitted in the gasket 7 over the polarizing film 2 so as to be spaced therefrom by e.g. 1 mm.

In this state, a mixture of the above-described prepolymer and aromatic polyamine is injected through the gates 7b. Thus, both sides of the polarizing film 2 are covered with polyurethane resin composition layers of the same thickness due to insert molding including polymerization reaction of the polyurethane resin material, and the polarizing element 3 is formed.

As shown in FIG. 6, the thus formed polarizing element 3 is inserted in the eyeglass forming mold assembly including the gasket 7 and the lower mold 8. The polarizing element 3 serves as the upper mold. In this state, the polarizing element 3 and the lower mold 8 are elastically pressed from upward and downward by a clip (not shown) through protective members and fixed in position.

In this state, a polyurethane resin material not containing an infrared absorbing agent is poured into the cavity defined between the polarizing element 3 and the lower mold 8 through the gates 7b. Thus, the infrared absorbing eyeglass lens substrate shown in FIG. 1 is produced, of which the eyeglass lens substrate 1 adapted to be ground for adjustment of lens power is integrally superposed on the polarizing element 3.

Materials used in the production of the infrared absorbing eyeglass lens substrates of the above-described embodiments are described in detail.

The polyisocyanate used in the polyurethane resin material is preferably a 4,4'-methylenebis(cyclohexyl isocyanate) or isophorone diisocyanate, which are cycloaliphatic diisocyanates.

Other polyisocyanates include hexamethylene diisocyanate, trimethyl hexamethylene diisocyanate, hydrogenated XD1, and norbornane diisocyanate. But they are not suitable for the present invention because the pot-life of the urethane resin obtained using these compounds is not sufficiently long.

The polyhydroxy compound used in this invention is a polyether diol or a polyester diol having an average molecular weight of 700 to 1200 or a mixture thereof.

Polyether diols usable in this invention include polyoxytetramethylene glycol obtained by subjecting tetrahydrafuran to ring-opening polymerization and other polyether diols. The polyester diol used in this invention may be any known polyesters but preferably is 1,4-butanediol adipate or 1,6-hexanediol adipate.

A polyether diol is preferable to a polyester diol because a prepolymer obtained by reacting a polyether diol with a diisocyanate has a lower viscosity, and thus such a prepolymer can be more easily cast. Thus, a polyether diol is especially preferable as the polyhydroxy compound used in the present invention.

In order to improve the hardness and chemical resistance, an aliphatic polyol having a molecular weight of not less than 300 may be further added. Such aliphatic polyols include diols such as ethylene glycol, diethylene glycol, propylene glycol, and 1,4-butanediol, and triols such as trimethylol ethane and trimethylol propane.

Aromatic polyamines that can be advantageously used in this invention typically include aromatic diamines. Among aromatic diamines, 4,4'-methylenebis(2-chloroaniline) is especially preferable because its pot-life is long during molding. But other known aromatic polyamine may be used. If the pot-life is short when using an aromatic polyamine, it may be necessary to carry out molding quickly or to take any other special care.

The above-mentioned known diamines include aromatic monocyclic diamines such as 2,4-diamino-3,5-diethyltoluene and 2,6-diamino-3,5-diethyltoluene, and aromatic polycyclic diamines such as 4,4'-methylene-bis(2,6-diisopropylaniline), 4,4'-methylene-bis(2,6-dimethylaniline), 4,4'-methylene-bis(2-ethyl-6-methylaniline), 4,4'-methylene-bis(2,6-diethylaniline), 4,4'-methylene-bis(2-isopropyl-6-methylaniline), and 4,4'-methylene-bis(3-chloro-2,6-diethylaniline).

In producing the prepolymer by reacting a polyisocyanate with a polyhydroxy compound in the present invention, the reaction molar ratio (NCO/OH) is preferably 2.5 to 4.0, and the NCO content in the obtained prepolymer is preferably 7.0 to 14.0%. If the reaction molar ratio and/or the NCO content is lower than the respective range, the viscosity of the prepolymer tends to be so high that it becomes difficult to form the polarizing element by casting. If higher than this range, curing physical properties deteriorate.

The mixing molar ratio (NCO/NH$_2$) between the prepolymer and the aromatic polyamine is preferably 1.10 to 0.90. Known curing conditions can be used.

The infrared absorbing agent is selected from those capable of absorbing infrared rays over the wavelength range of 780 to 2500 nm, and may be a known infrared absorbing pigment. Such infrared absorbing agents include:
(1) N,N,N',N'-tetrakis(p-substituted phenyl)-p-phenylenediamines, benzidines, and their aluminum salts and diimonium salts;
(2) N,N,N',N'-tetrarylquinone diimonium salts; and
(3) bis-(p-dialkylaminophenyl)[N,N-bis(p-dialkylaminophenyl)p-amino-phenyl]aminium salts Ultraviolet absorbing agents which can be used as necessary include:
(1) 2-hydroxy-4-n-octoxybenzophenone
(2) 4-dodecyloxy-2-hydroxybenzophenone
(3) 2-2'-hydroxy-4-methoxybenzophenone If ultraviolet absorbing agents are used, all ultraviolet rays should absorbed, including UV-A, of which the wavelength is long (315 to 400 nm), UV-B, whose wavelength is short (280 to 315 nm), and UV-C, whose wavelength is further short (100 to 280 nm).

For example, in order to erase blue flames in welding light, it is necessary to absorb rays having wavelengths in the range of 380-450 nm. If the polarizing film and an infrared absorbing agent are used, rays in this wavelength range are absorbed without adding a dye. But if the polarizing film is not used, it is necessary to add a yellow dye, orange die, red dye, or their mixture to the resin.

In order to obtain a brownish eyeglass lens, a yellow dye, orange dye, red dye or their mixture is used.

In order to dye the polarizing film, a water-soluble dye should be selected. To dye the urethane resin, an oil-soluble dye is preferable.

Such dyes include direct dyes, acidic dyes, basic dyes, sulfur dyes, disperse dyes and oil-soluble dyes. A dye having good fastness properties should be selected.

The infrared absorbing agent is ordinarily added by preferable 0.05 to 10 parts by weight based on 100 parts by weight of the material forming the lens (impact-resistant urethane), and if the lens is used for purposes other than light shield purposes, its content is preferably 0.1 to 1.0 parts by weight based on 100 parts by weight of the urethane. If the lens is used for light shielding purposes, its content should be determined taking into account the degree to which infrared rays are desired to be absorbed.

The ultraviolet absorbing agent is added by 0.01 to 4 parts by weight, preferably 0.1 to 4.0 parts by weight, more preferably 0.2 to 0.5 parts by weight, based on 100 parts by weight of the material forming the lens (impact-resistant urethane).

The eyeglass lens according to the present invention allows passage of visible light in the wavelength range of at least 380 to 780 nm with the transmittance of 1 to 75%, and preferably with the transmittance of 10-40% if the lens is used for purposes other than the light shield purposes.

The transmittance of ultraviolet rays (wavelength range of 100 to 380 nm) of the lens should be less than 0.1%, preferably less than 0.02%. By adding an ultraviolet absorbing agent, the durability of the infrared absorbing agent improves when the lens is used outdoors.

The transmittance of infrared rays (wavelength range of 780 to 2500 nm) should be not more than 80%, preferably not more than 30% on the average. According to the users' requirements such as requirements regarding fashinability, the average transmittance of infrared rays may be adjusted to a higher value. But if the lens is used for a light shield/protector such as for use in welding, the infrared transmittance should be determined based on the set standards.

If the lens is used for purposes other than light shielding, its color tone is determined freely taking into account fashinability. Preferably, the color tone is adjusted by adding an infrared absorbing agent to a lens of which the ratio A|B≦0.3 where A and B are the average light transmittances (%) in the wavelength range of 380 to 550 nm and 550 to 780 nm, respectively.

While the color tone of the eyeglass lens can be variously adjusted, it may be restricted to some extent due to the fact that many of infrared absorbing agents are greenish. The color tone should be determined taking into consideration the infrared absorbing ability of the infrared absorbing agent and fashionability.

The eyeglass lens may be subjected to hard coating, in which a reinforced coating film is formed on the lens by immersing the lens in a solution containing e.g. a silicon compound, thereby increasing the surface hardness of the lens. The lens may be further subjected to anti-fogging treatment, antireflection treatment, chemical resistance treatment, antistatic treatment, mirror treatment, and/or water repellent treatment to improve its various properties.

The thus produced eyeglass lens reduces transmission of harmful infrared and ultraviolet rays and thus is suitable for use in places exposed to extremely strong sunlight and can prevent damage to the eyes of even a person of weak eyesight by harmful light.

It is obligated to wear a light-shield/protecting means in a work environment where the worker is exposed to harmful ultraviolet rays or strong visible light or infrared rays, such as during welding, under JIS T 8141. By adjusting the content of the infrared absorbing agent and pigments, the lens according to the present invention is usable for such work environments as a light shield lens.

By making adjustments according to the present invention, the eyeglass lens of the present invention can reliably prevent damage (of the following five kinds) to the eyes due to harmful light.
(1) Damage to the cornea and conjunctiva due to ultraviolet rays UV-B and C
(2) Damage to the crystalline lens due to ultraviolet rays UV-A
(3) Optical damage to the retina due to blue light
(4) Damage to the cornea and crystalline lens due to visible light and near-infrared rays
(5) Damage to the cornea due to near and middle infrared rays
Examination was made as to the deterioration in the ability of the infrared absorbing eyeglass lens substrate thus obtained to absorb infrared rays.

The word "part(s)" and the symbol "%" used in the following examples of the invention and comparative examples refer to "part(s) by weight" and "% by weight", unless otherwise specified.

[Production of Prepolymer]

200 parts of polyoxytetramethylene glycol having an average molecular weight of 1014 (PTG-1000N, made by Hodogaya Chemical Co., Ltd.) was put in a 500 ml separable flask including a thermometer, a stirrer and a nitrogen sealing tube, heated while stirring in a nitrogen current, and was dehydrated under a reduced pressure of 100-110° C./3-5 mmHg for an hour. After dehydration, 170 parts of 4,4'-methylene-bis(cyclohexyl isocyanate) (Desmodule-W, made by Sumitomo Bayer Urethane Co., Ltd.) was added and the mixture was reacted for two hours to produce a prepolymer. The thus obtained prepolymer was a colorless transparent liquid with the NCO content of 9.9%, and the viscosity of 8600 mPa·s/30° C. and 750 mPa·s/60° C.

Production Example 1 of the Eyeglass Lens Substrate 100 parts of the obtained prepolymer was heated to 70° C. was mixed with 31.4 parts by weight of 4,4'-methylene-bis(2-chloroaniline) and the mixture was defoamed. The mixture was poured into a mold preheated to 100° C. and cured by heating at 100° C. for 24 hours to produce the eyeglass lens substrate. The mixing molar ratio ($NCO/NH_2$) at this time was 1.0.

Production Example of the Polarizing Element

Figure 8:
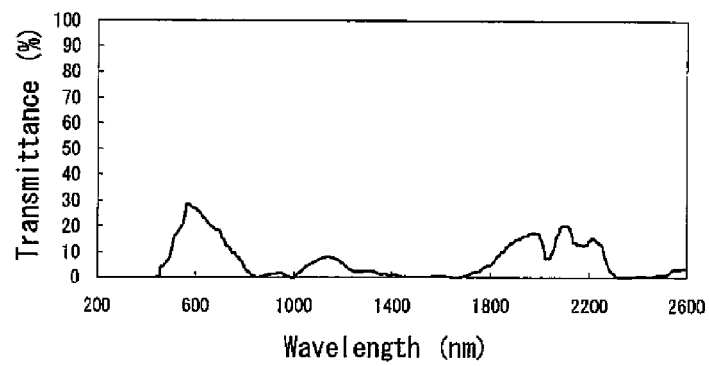
FIG. 8 is a near-infrared spectral chart of a polarizing element produced according to a production example of the invention.

A polarizing film made of a polyvinyl alcohol of a reddish color tone (Copper 30) was placed in a mold for the polarizing element beforehand, and a molding material was poured into the mold for insert molding. The polarizing element was produced in exactly the same manner as described above, except that as the infrared absorbing agent, 0.13 parts by weight of a diimonium compound was added to the molding material (mixture) for the eyeglass lens substrate. FIG. 8 shows a near-infrared spectral chart of the thus obtained polarizing element (about 2.0 mm thick).

Based on the results of FIG. 8, the transmittance of infrared rays in the wavelength range of 780 to 2500 nm is 3.93% on the average (the average transmittance of infrared rays in the wavelength range of 780 to 1700 nm is 2.27%). Thus it is apparent that the infrared absorbing agent in the polarizing element does not deteriorate and maintains the required infrared absorbing ability.

Figure 9:
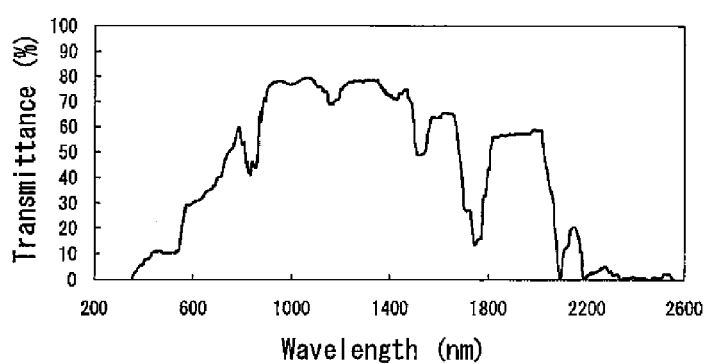
FIG. 9 is a near-infrared spectral chart of a polarizing element produced according to comparative production example 1.

Comparative Production Example 1 of Polarizing Element 0.13 parts by weight of a diimonium compound (IRG-022, made by Nippon Kayaku Co., Ltd.) as an infrared absorbing agent was added to 100 parts by weight of a high refractive index resin (thiourethane resin MR-7, made by Mitsui Chemicals, Inc.; refractive index: 1.67), and a polarizing element was produced by casting the mixture with a polarizing film of polyvinyl alcohol of a reddish color tone (Copper 15) sandwiched. FIG. 9 shows a near-infrared-spectral chart of the thus obtained polarizing element (lens thickness: about 2.4 mm).

Based on the results of FIG. 9, the transmittance of infrared rays in the wavelength range of 780 to 2500 nm is 47.70% on the average (the average transmittance of infrared rays in the wavelength range of 780 to 1700 nm is 70.26%). Thus it is apparent that no required infrared absorbing capacity is achieved due to deterioration of the infrared absorbing agent by reacting with sulfur components.

Figure 10:
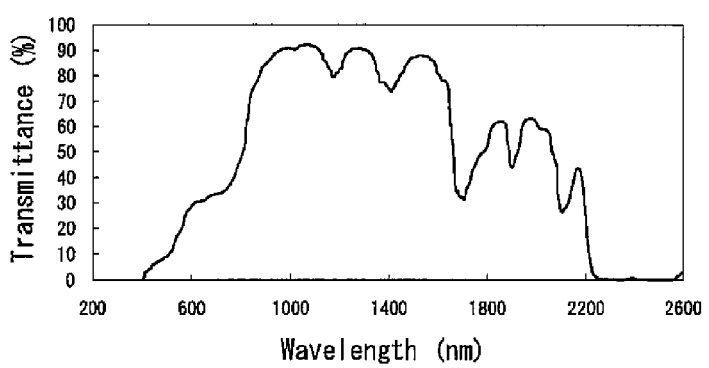
FIG. 10 is a near-infrared spectral chart of a polarizing element produced according to comparative production example 2.

Comparative Production Example 2 of Polarizing Element 0.13 parts by weight of a diimonium compound (IRG-022, made by Nippon Kayaku Co., Ltd.) as an infrared absorbing agent was added to 100 parts by weight of allyl diglycol carbonate (CR-39) as a base resin, and a polarizing element was produced by casting the mixture with a polarizing film of polyvinyl alcohol of a reddish color tone (Copper 30) sandwiched. FIG. 10 shows a near-infrared spectral chart of the thus obtained polarizing element (lens thickness: about 2.0 mm).

Based on the results of FIG. 10, the transmittance of infrared rays in the wavelength range of 780 to 2500 nm is 58.2% on the average (the average transmittance of infrared rays in the wavelength range of 780 to 1700 nm is 81.47%). Thus it is apparent that no required infrared absorbing capacity is achieved due to deterioration or decomposition of the infrared absorbing agent by reacting with IPP, a peroxide catalyst.

Thus, the polarizing element according to the present invention, which comprises a polyurethane resin obtained by addition polymerization of a prepolymer obtained by reacting polyisocyanate with a polyhydroxy compound, and an aromatic polyamine and further contains an infrared absorbing agent, shows excellent infrared absorbing capacity. When this polarizing element is integrated with a lens substrate by molding, the infrared absorbing agent never deteriorates or decomposes.

What is claimed is:

1. An infrared absorbing polarized eyeglass lens comprising:
a polarizing element comprising a polarizing film and a polyurethane resin material containing an infrared absorbing agent and covering two surfaces of the polarizing film; and
an eyeglass lens substrate made of a polyurethane resin not containing an infrared absorbing agent and configured to be ground for adjusting lens power, the polarizing element being superposed on one side of the eyeglass lens substrate and integrated therewith by insert molding which accompanies polymerization reaction of the polyurethane resin material.

2. The lens of claim 1, wherein the polyurethane resin material comprises a prepolymer obtained by reacting polyisocyanate with a polyhydroxy compound, and further contains an aromatic polyamine as a curing agent.

3. The lens of claim 2, wherein the prepolymer is a polyurethane prepolymer obtained by reacting polyisocyanate with a polyhydroxy compound in the reaction molar ratio (NCO/OH) of 2.5 to 4.0 so that its NCO content is 7.0 to 14.0%.

4. The lens of claim 1, wherein the polarizing film is a stretched film of polyvinyl alcohol resin impregnated with iodine or an iodine compound.

5. The lens of claim 2, wherein the polarizing film is a stretched film of polyvinyl alcohol resin impregnated with iodine or an iodine compound.

6. The lens of claim 3, wherein the polarizing film is a stretched film of polyvinyl alcohol resin impregnated with iodine or an iodine compound.

7. The lens of claim 1, wherein the two surfaces of the polarizing film are covered by layers of the polyurethane resin of the same thickness, respectively.

8. The lens of claim 2, wherein the two surfaces of the polarizing film are covered by layers of the polyurethane resin of the same thickness, respectively.

9. The lens of claim 3, wherein the two surfaces of the polarizing film are covered by layers of the polyurethane resin of the same thickness, respectively.

10. The lens of claim 4, wherein the two surfaces of the polarizing film are covered by layers of the polyurethane resin of the same thickness, respectively.

11. The lens of claim 5, wherein the two surfaces of the polarizing film are covered by layers of the polyurethane resin of the same thickness, respectively.

12. The lens of claim 6, wherein the two surfaces of the polarizing film are covered by layers of the polyurethane resin of the same thickness, respectively.

13. A method of manufacturing an infrared absorbing polarized eyeglass lens, said method comprising:

forming an eyeglass lens substrate from a polyurethane resin not containing an infrared absorbing pigment, the eyeglass lens substrate being configured to be ground for adjusting lens power;

inserting the thus formed eyeglass lens substrate into a mold assembly for forming eyeglass lenses;

inserting a polarizing film into a cavity defined by a lens surface of the eyeglass lens substrate and an inner surface of the mold assembly with laminar gaps defined on two surfaces of the polarizing film, respectively; and pouring a polyurethane resin material containing an infrared absorbing pigment into the mold assembly such that the laminar gaps are filled with the polyurethane resin material, thereby casting the polyurethane resin material into a polarizing element, whereby the polarizing element is superposed and integrated with the eyeglass substrate due to polymerization reaction of the polyurethane resin material.

14. A method of manufacturing an infrared absorbing polarized eyeglass lens, said method comprising:

forming a polarizing element comprising a polarizing film and a polyurethane resin material containing an infrared absorbing pigment and covering two surfaces of the polarizing film;

inserting the thus formed polarizing element into a mold assembly for forming lenses; and pouring a polyurethane resin not containing an infrared absorbing pigment into a gap defined between the polarizing element and the mold assembly, thereby casting the polyurethane resin into an eyeglass lens substrate configured to be ground for adjusting lens power, whereby the polarizing element is superposed and integrated with the eyeglass substrate due to polymerization reaction of the polyurethane resin material.

* * * * *